United States Patent [19]

Koleff et al.

[11] 4,072,860

[45] Feb. 7, 1978

[54] APPARATUS FOR OPTICAL SCANNING OF MICROFILMS OR THE LIKE

[75] Inventors: Boris Koleff, Munich; Wilfried Hofmann, Taufkirchen, both of Germany

[73] Assignee: AGFA-Gevaert Aktiengesellschaft, Leverkusen, Germany

[21] Appl. No.: 685,088

[22] Filed: May 10, 1976

[30] Foreign Application Priority Data

May 30, 1975 Germany ............... 2524154

[51] Int. Cl.² ............................................. H01J 3/14
[52] U.S. Cl. ................................. 250/216; 353/27 A
[58] Field of Search ................. 350/86, 90; 33/1 M, 33/1 AA; 356/201, 202, 203; 250/216, 570; 353/25, 27 A, 60

[56] References Cited

U.S. PATENT DOCUMENTS

| | | | |
|---|---|---|---|
| 3,273,953 | 9/1966 | Davee | 353/60 |
| 3,528,735 | 9/1970 | Bluitt et al. | 353/27 A |
| 3,765,745 | 10/1973 | Burboeck | 350/90 |
| 3,829,222 | 8/1974 | Aslund | 356/203 |
| 3,951,532 | 4/1976 | Kropp | 33/1 M |

Primary Examiner—David C. Nelms
Attorney, Agent, or Firm—Peter K. Kontler

[57] ABSTRACT

Optical scanning apparatus for microfilms or test films has a first carriage which is movable along the X-axis of a coordinate system, a second carriage which is mounted on the first carriage and is movable along the Y-axis of the coordinate system, a magnetic coupling device which connects a portion of the margin of a film to the second carriage so that each and every bit of information on the film can be moved into register with a reference point at the upper side of a horizontal base plate, and an optical scanning system having a light source below the base plate, an annular insert mounted in the base plate and serving to transmit light upwardly through the film at the reference point of the upper side of the base plate, and a magnifying lens system or a photoelectric cell above the film in register with the insert. A fan can direct a stream of air upwardly toward and through the insert to cool the light source and to impinge against the underside of the film so as to remove dust and reduce friction between the insert and the film.

19 Claims, 6 Drawing Figures

APPARATUS FOR OPTICAL SCANNING OF MICROFILMS OR THE LIKE

BACKGROUND OF THE INVENTION

The present invention relates to apparatus for optical scanning of light-transmitting flexible sheet-like carriers of information, especially microfilms or twin-layer test films whose gradation is different for different colors of copying light. More particularly, the invention relates to apparatus wherein a sheetlike carrier of information is moved in several directions by one or more power-driven components so as to place selected portions of the carrier in register with a reference point, e.g., with a source of light and a photoelectric transducer or a magnifying lens system. The selected portions of the carrier can be viewed on a screen, or the information which is obtained as a result of scanning can be transmitted to the evaluating circuit of a computer or the like.

Certain presently known reading apparatus for microfilms or the like are provided with means for moving a sheet-like information carrier in several directions with respect to an optical scanning unit. In a microfilm reader, the light source emits a bundle of light rays which suffices to illuminate an entire film frame, e.g., a miniature image of an entire page in a book, publication or the like. The image of the frame is enlarged by a suitable optical system which projects the enlarged image onto a screen.

Similar apparatus are used in the field of graphic arts to scan test images of wedge-like grey filters which are exposed onto sheets of photographic film. The scanning is utilized to determine proper exposure conditions. Still further, similar apparatus can be used for effecting exposure of photographic films which are to be used for storage of microimages or in the graphic arts.

German OS No. 2,313,349 discloses an apparatus which can control the exposure of photographic films to light. In the first step, one produces a test film by copying a wedge-like filter with light in two colors whereby the ratio of the two colors varies at right angles to the direction of change of filter density. The two colors effect different gradation of the material. Based on its maximum and minimum densities, the film can be used to calculate the combined exposure time in the two colors and the ratio of the colors. The test film renders it possible to avoid a series of calibrating operations because it is treated in the same way as the actual copies, i.e., the density values of the test film can be compared with desired density values of the copies to obtain the optimum values for exposure of copies to photographic light. The exposure of test film preferably takes place in the apparatus which is used for the making of copies. This insures that no exposure errors can occur as a result of differences between the characteristics of two or more discrete copying apparatus.

German Pat. application Ser. No. P 25 12 055. discloses an apparatus wherein a test film or an analogous carrier of information is mounted in a circumferentially complete frame prior to scanning by means of a device including a light source and a photosensitive transducer. The mounting of carriers in a frame takes up substantial amounts of time. Furthermore, the frame is sturdy and its mass is considerable so that the apparatus must be equipped with powerful prime mover means and bulky motion transmitting means for shifting the frame and the carrier therein relative to the scanning system. Alternatively, the scanning system must be moved relative to the frame.

SUMMARY OF THE INVENTION

An object of the invention is to provide a novel and improved apparatus for optical scanning of photographic films or analogous sheet-like light-transmitting carriers of information wherein the carriers can be rapidly inserted or removed as well as transported in one or more directions by simple, compact, lightweight and relatively inexpensive means.

Another object of the invention is to provide an apparatus wherein a sheet-like carrier of information is invariably held in an optimum position relative to the optical system in spite of the fact that the carrier need not be mounted in a frame so that the major portion of its margin remains unconfined during exposure to light.

A further object of the invention is to provide the apparatus with novel and improved means for separably coupling sheet-like carriers to the device which moves such carriers with respect to the optical system.

An additional object of the invention is to provide a compact and simple but versatile apparatus which can be used as a means for exposing photographic sheet material to light and/or for facilitating controlled scanning of photographic sheets and for transmission of the thus obtained information to a computer or other evaluating means.

The invention is embodied in apparatus for optically scanning light-transmitting carriers of information, particularly microfilms or test films. The apparatus comprises a support having a substantially horizontal upper side, first elongated guide means which is provided on the support, a first carriage which is movable along the guide means, second elongated guide means which is provided on the first carriage, a second carriage which is movable along the second guide means, the two guide means being parallel to the upper side of the support, coupling means provided on the second carriage and including a supporting surface for a portion only of the margin of a preferably polygonal carrier of information and means for separably retaining such portion of the margin in contact with the supporting surface which latter is parallel with and closely adjacent to the upper side of the support, means for moving the carriages along the respective guide means through distances which suffice to place any desired portion of information on a carrier which is coupled to the second carriage in register with a predetermined portion of the upper side of the support, and optical scanning means including means for illuminating that portion of information on a carrier which registers with the predetermined portion of the upper side of the support.

The nature of coupling means (which may include a magnet in or on the supporting surface and a ferromagnetic retaining means or vice versa) is such that a carrier can be attached to or detached from the second carriage with minimal losses in time and that the carrier can be moved relative to the scanning means with the exertion of a minimal force. The weight of coupling means for the carrier is but a fraction of the weight of conventional coupling means, especially since the carrier is clamped or otherwise held only along a small part of its margin so that the major part of its margin remains unconfined.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view of a detachable portion of the means for coupling a sheet-like carrier of information to the apparatus.

DESCRIPTION OF THE PREFERRED EMBODIMENTS

Figure 1:
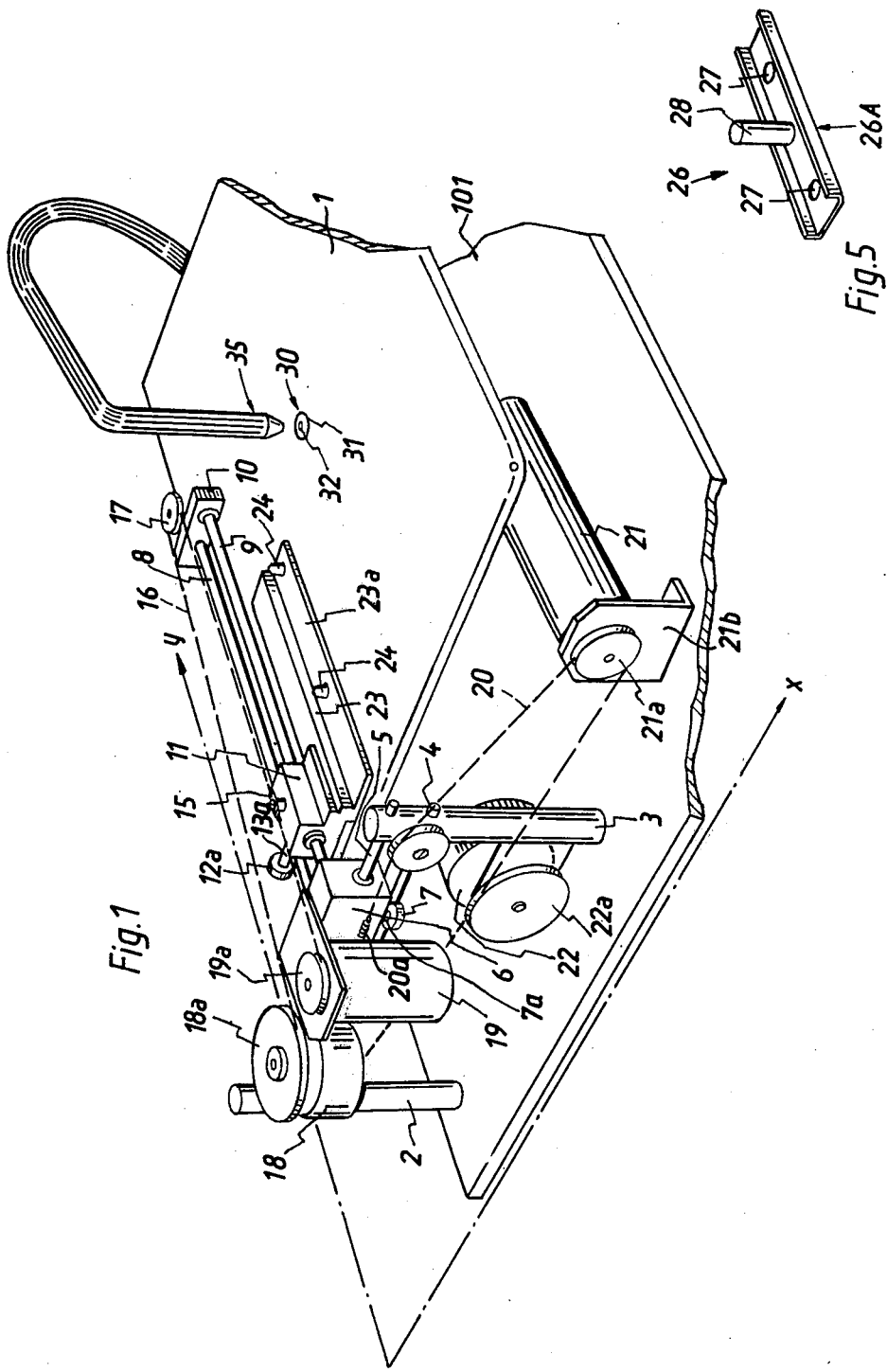
FIG. 1 is a fragmentary perspective view of an apparatus which embodies the invention.

The apparatus of FIG. 1 comprises a support including a horizontal base plate 1 and a table 101 which supports two carriages or slides 6 and 11. The carriage 6 is reciprocable along first guide means including two horizontal tie rods 4, 5 whose end portions are mounted in two spaced-apart upright posts 2, 3 anchored in the table 101 close to one marginal portion of the base plate 1. The tie rod 5 is located at a level above the tie rod 4 and extends through an elongated bore or opening of the substantially prismatic carriage 6 which has two downwardly extending 7a (one shown in FIG. 1) at the opposite sides of the lower tie rod 4. The shafts 7a carry roller followers 7 which track the tie rod 4. At least one of the roller followers 7 is adjustable relative to the carriage 6 so that such adjustment can result in a change of angular position of the carriage 6 with respect to the upper tie rod 5. When the apparatus is in use, the carriage 6 can move lengthwise of but cannot turn on the tie rod 5.

The carriage 6 supports a second guide means including two parallel tie rods 8 and 9 which extend from one of its vertical sides and serve to support and guide the second carriage 11. Those end portions of the tie rods 8, 9 which are remote from the carriage 6 are connected to each other by a crosshead 10. The carriage 11 has an elongated opening or bore for the tie rod 9. That side of the carriage 11 which faces the tie rod 8 supports two horizontal shafts 13a, 13b for roller followers 12a, 12b which are respectively disposed above and below and track the tie rod 8 when the carriage 11 moves along the tie rod 9. The tie rods 4, 5 and 8, 9 are parallel to the upper side of the base plate 1.

Figure 3:
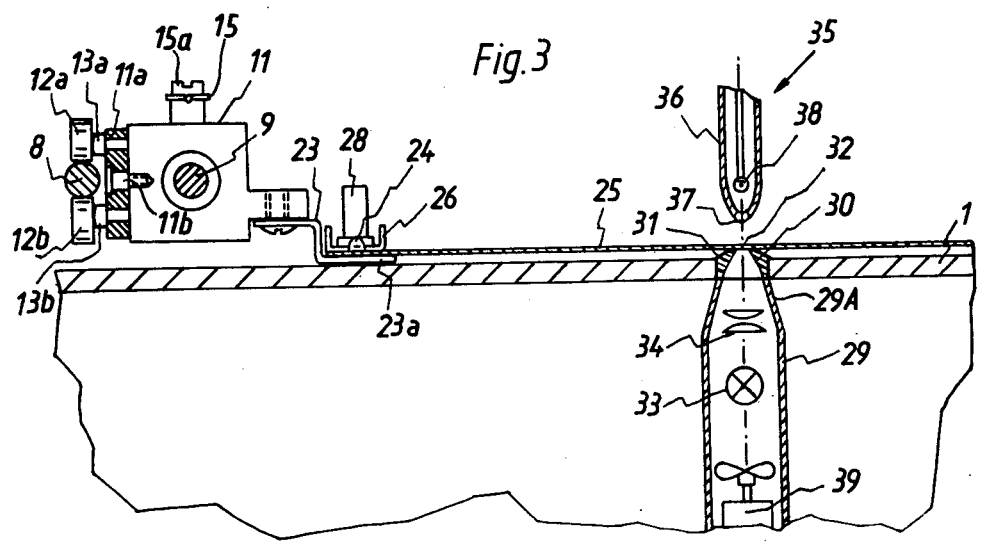
FIG. 3 is a vertical sectional view as seen in the direction of arrows from the line III—III of FIG. 2.
Figure 4:
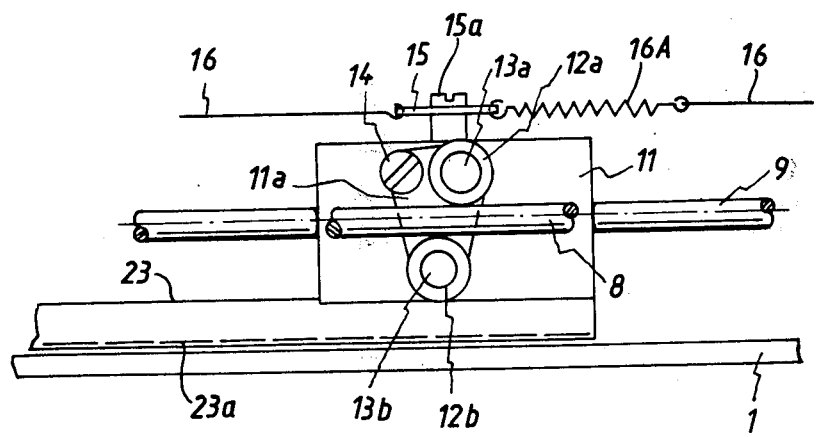
FIG. 4 is an enlarged view of a detail as seen in the direction of arrow A in FIG. 2.

The just mentioned side of the carriage 11 is shown on a larger scale in FIG. 4. The shafts 13a, 13b are mounted in platelike holder 11a which is turnably mounted on the carriage 11 (as at 11b, see FIG. 3) and can be fixed in a selected angular position by a screw 14 or the like. The adjustability of holder 11a with respect to the carriage 11 insures that the roller followers 12a, 12b engage the respective sides of the tie rod 8 with minimal clearance so that the carriage 11 is held against angular movement with respect to the tie rod 9.

Figure 2:
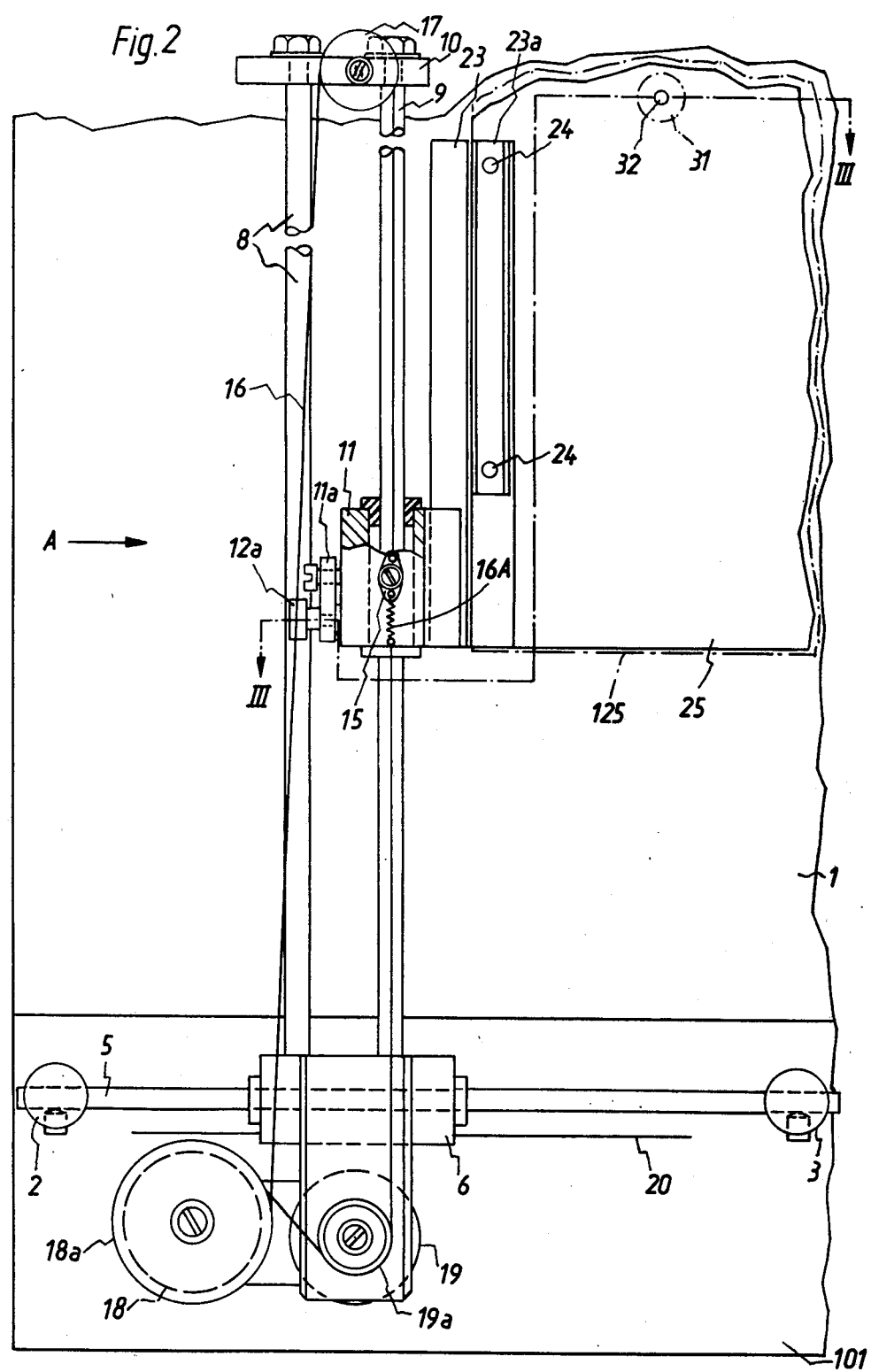
FIG. 2 is a fragmentary plan view of the apparatus.

The means for moving the carriage 6 and 11 lengthwise of the respective tie rods 5 and 9 comprises cables, cords or analogous flexible elements 20 and 16. As shown in FIGS. 3 and 4, the upper side of the carriage 11 supports a small plate 15 which is secured thereto by one or more screws 15a or analogous fasteners and is coupled to one end of the cable 16. The plate 15 has two apertures one of which receives the suitably bent end portion of the cable 16 and the other of which receives one end convolution of a helical spring 16A. The cable 16 is trained over an idler pulley 17 which is mounted on the crosshead 10, over a second pulley 18a which is mounted on and can adjust a potentiometer 18, and a driver pulley 19a which can be rotated by a motor 19. The other end portion of the cable 16 is attached to the spring 16A, i.e., to the plate 15. FIG. 2 shows that a portion or stretch of the cable 16 (between the pulleys 17 and 19a is parallel or nearly parallel to the direction of reciprocatory movement of the carriage 11 along the tie rod 9. The motor 19 and the potentiometer 18 are mounted on the carriage 6.

The cable 20 for the carriage 6 is trained over a driver pulley 21a which can be rotated by a motor 21, a pulley 22a which is mounted on and can adjust a potentiometer 22, and an idler pulley (not shown in FIG. 1). One end portion of the cable 20 is directly coupled to a holder (not shown) on the carriage 6, and the other end portion of the cable 20 is connected to such holder through the medium of a helical spring 20a. The motor 21 is mounted on a bracket 21b of the table 101. The potentiometer 22 is also mounted on the table 101. The latter supports and is located below and is spaced apart from the base plate 1.

The carriage 11 is rigid with an elongated platform 23 which is parallel to the tie rods 8, 9. The tie rod 9 is located between the platform 23 and the tie rod 8, and the platform 23 has an elongated thin ledge 23a which is adjacent and parallel to but spaced from the upper side of the base plate 1. The distance between the underside of the ledge 23a and the upper side of the base plate 1 can be minimal. The material and dimensions of the platform 23 and its ledge 23a are selected in such a way that the weight of a sheet 25 of photographic film or another light-transmitting information carrier which is supported by the carrier-supporting upper surface of the ledge 23a cannot change the position of this ledge relative to the base plate 1. The ledge 23a has two upwardly extending projections or pins 24 which are mounted thereon (or made integral therewith) at a predetermined distance from each other (as considered in the direction of reciprocatory movement of the carriage 11 along the tie rod 9). The pins 24 can enter complementary openings 25a (FIG. 6) of a carrier 25 which extends beyond the upper surface of the ledge 23a and above the upper side of the base plate 1. The distance between the upper sides of the ledge 23a and base plate 1 may be between two and four times the thickness of a carrier 25.

The upper side of that portion of the carrier 25 which overlies the upper surface of the ledge 23a is overlapped by a strip-shaped retaining member 26 (see also FIG. 5) having a shape which is similar to or matches that of the ledge 23a. The retaining member 26 has two openings 27 which receive portions of the pins 24. The underside of the retaining member 26 is provided with a layer 26A of magnetic material so that the position of retaining member 26 with respect to the ledge 23a (which consists of ferromagnetic material) normally remains unchanged when the upper end portions of the pins 24 enter the respective openings 27. The retaining member 26 has a handle 28 which facilitates its detachment from the pins 24 so that the operator can remove a carrier 25 prior to placing of another carrier onto the ledge 23a in such a way that the openings 25a of the new carrier receive the pins 24. The parts 23, 26 constitute a simple but effective means for coupling only one portion of the margin of a generally square carrier to the carriage 11. Such portions of the margin extends between two neighboring corners of the carrier. The attachment of a carrier 25 to the carriage 11 requires only two manipulations, namely the placing of a carrier onto the ledge 23a in such a way that the pins 24 enter the openings 25a, and placing of the retaining member 26 onto the carrier 25 in such a way that the pins 24 enter the openings 27.

The table 101 further supports the major part of an optical scanning device for a carrier 25 which is secured to the ledge 23a. The scanning device is mounted at a predetermined distance from the paths of movement of the carriages 6 and 11, i.e., at such a distance that, by moving the carriage 6 and/or 11 along the respective tie rod(s), each and every information-bearing portion of the carrier 25 can be moved into the range of the scanning device. As shown in FIG. 3, the major part of a carrier 25 (including the major part of its margin) remains unconfined and can be moved relative to and into the range of the scanning device.

The scanning device comprises a tube 29 which is preferably straight but may have an arcuate shape and is located at a level below the base plate 1. The upper end portion 29A of the tube tapers in a direction toward the underside of the base plate 1. The opening at the top of the end portion 29A is immediately adjacent to and in register with the lower end of an annular (preferably cylindrical) insert 30 which is mounted in an opening of the base plate 1. The outer diameter of the lower portion of the cylindrical insert 30 equals or closely approximates the outer diameter of the uppermost part of the tapering end portion 29A of the tube 29. The upper portion 31 of the insert 30 resembles a portion of a hollow sphere having a flat which is parallel to and located slightly above the upper side of the base plate 1. The extent to which the portion 31 of the insert 30 projects above the base plate 1 equals or closely approximates the distance between the upper side of the base plate and the carrier-supporting surface at the upper side of the ledge 23a. This insures that, while resting on the portion 31 and while being held between the ledge 23a and retaining member 26, the carrier 25 is located in a plane which is parallel to the upper side of the base plate 1. The configuration of the passage 32 in the insert 30 is such that it constitutes an upward extension of the conical passage in the end portion 29A of the tube 29. This is shown in FIG. 3. Thus, the passage 32 has a maximum diameter at the lower end and a minimum diameter at the upper end of the insert 30.

The tube 29 contains illuminating means including at least one light source 33 which is coaxial therewith and emits light rays in a direction toward and through the passage 32. Such light rays pass through and are focussed by a system of lenses 34 in the plane of the carrier 25 above the upper end of the passage 32. The optical axis of the lens system 34 coincides with the axis of a receiver unit 35 which is located above the carrier 25 and comprises a tubular housing 36 secured to the base plate 1 or to the table 101 and having an end portion provided with an opening 37 which faces the insert 30 in the base plate 1. The opening 37 is closely adjacent to the upper end of the passage 32. The housing 36 contains a photosensitive transducer 38 (e.g., a photoelectric cell) which is located slightly above the opening 37 and is electrically connected with the evaluating circuit of a computer, not shown.

The tube 29 further contains a fan 39 which is mounted below the light source 33 and serves to direct a stream of air upwardly so as to flow through the passage 32 and to impinge against the underside of the carrier 25. The tube 29 and the insert 30 can be said to constitute a nozzle having an orifice 32 adapted to guide the air stream against the carrier 25.

Figure 6:
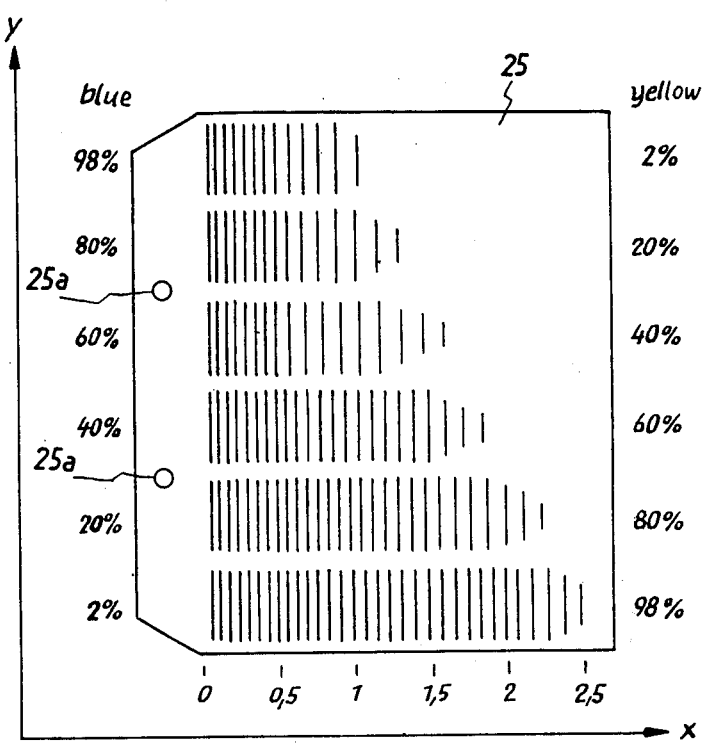
FIG. 6 is a plan view of a sheet-like carrier which can be scanned in the apparatus of FIGS. 1 and 2.

FIG. 6 shows a substantially square carrier 25 which constitutes a test film and has openings 25a for the pins 24 of the ledge 23a. The carrier 25 was exposed to light through a wedge-like grey filter of a thickness decreasing (in a direction from the left to right, as viewed in FIG. 6) from 2.5 millimeters to zero. The ratio of blue light increased from the lower toward the upper edge of the sheet 25 from zero to 100 percent and the ratio of yellow light increased in the opposite direction from zero to 100 percent. Thus, the combined amount of yellow and blue light at any point of the carrier 25 equals 100 percent. In the coordinate system of FIG. 6, the density of the filter as well as the ratio of the two lights can be determined at any desired point of the carrier 25.

The operation of the apparatus of FIGS. 1 to 5, for the purpose of scanning information on a carrier 25, is as follows:

In the first step, the film which is to constitute a carrier 25 is formed with openings 25a, exposed to light and developed in a manner not forming part of the invention. The film is preferably exposed in the improved apparatus. The developed carrier 25 is thereupon mounted between the ledge 23a and retaining member 26 so that its openings 25a snugly receive portions of the pins 24. The carriages 6 and 11 are held in starting positions in which the light beam issuing from the passage 32 of the insert 30 in the base plate 1 illuminates that portion of the carrier where the ratio of blue light to yellow light is 98 to 2 percent. The density of this portion of the carrier is assumed to equal zero. In its starting position, the carriage 11 is immediately adjacent to or abuts against the carriage 6 and the starting position of carriage 6 is that in which the latter is closely adjacent to or abuts against the post 3. The motor 21 is then started to move the carriage 6 lengthwise of the tie rod 5, i.e., in parallelism with the X-axis of the coordinate system. The transducer 38 is illuminated by light issuing from the source 33 and passing through the carrier 25 along a line extending in parallelism with the X-axis whereby the transducer transmits electric signals to the evaluating circuit of the computer. The evaluating circuit also receives signals from the potentiometers 18 and 22, such signals being indicative of momentary positions of the carrier 25 with respect to the scanning device. When the carriage 6 reaches its other end position (close to or in abutment with the post 2), the circuit of the computer has completed the evaluation of density of the carrier 25 along a line which is normal to the Y-axis. The monitoring operation is then interrupted and the motor 21 is started in reverse to return the carriage 6 to its starting position. At the same time, the motor 19 is started to move the carriage 11 along the tie rod 9 to a position in which the scanning device can monitor another line of the carrier 25 which also extends in parallelism with the X-axis (e.g., a line where the ratio of blue light to yellow light is 80 to 20 percent.

The upper end portion 31 of the insert 30 eliminates or reduces friction between the underside of the carrier and the base plate 1 while the carriage 6 and/or 11 is in motion. The evaluating operation is then resumed by moving the carriage 6 toward the post 2, interrupted while the carriage 6 moves back to its starting position and the carriage 11 moves in parallelism with the Y-axis, resumed while the carriage 6 moves toward the post 2, and so forth, as often as necessary.

The fan 39 blows air upwardly through the passage 32 while the carriage 6 and/or 11 moves the carrier 25 relative to the base plate 1. This results in a further reduction of friction between the carrier 25 and the stationary parts of the apparatus, i.e., the underside of the carrier slides along the top face of the upper portion 31 of the insert 30 practically without any resistance. Furthermore, the stream of air issuing from the passage 32 blows away any particles of dust or other foreign matter which happen to adhere to the underside of the carrier 25. This is of importance because, in the absence of the fan 39, particles of dust could accumulate in the passage 32 to adversely influence the scanning action of the transducer 38 in the housing 36.

For many types of scanning operations, it is desirable to place the surface at the upper side of the ledge 23a at the level of the top face of the upper portion 31 of the insert 30. This insures that the carrier 25 is located in a plane which is parallel to the upper side of the base plate 1 (provided that the material of the carrier is sufficiently stiff to be self-supporting or substantially self-supporting). However, such positioning of the upper side of the ledge 23a relative to the top face of the portion 31 of insert 30 is not absolutely necessary for accurate guidance and movements of the carrier 25.

Another function of the fan 39 is to cool the light source 33. Such cooling is necessary and desirable in order to prevent overheating of the tapering upper end portion 29A of the tube 29 which, in turn, would result in overheating of the insert 30 and eventual damage to the carrier 25.

In accordance with a modification of the illustrated apparatus, the latter can be provided with a transparent cover or panel 125 (shown in FIG. 2 by phantom lines) which overlies the carrier 25 above the upper side of the base plate 1. The cover 125 is relatively stiff so that it prevents any, or any pronounced, upward flexing of the carrier 25 when the passage 32 conveys a stream of air produced by the fan 39. The pressure of air which flows upwardly through the tube 29 and insert 30 can be increased when the apparatus comprises a transparent cover 125 so that the ascending air stream urges the upper side of the carrier 25 against the underside of the cover. This insures that the carrier portion which is located between the insert 30 and the opening 37 is invariably located at a fixed distance from the lens system 34.

The computer which receives signals from the transducer 38 and potentiometers 18, 22 can be of the type disclosed in German Pat. application Ser. No. 25 12 055.2. Such computer transmits signals to the motors 19 and 21 so that the carriages 6 and 11 are moved at predetermined intervals and to a predetermined extent. The computer also calculates the exposure times.

The improved apparatus is adapted to be used, without any basic modifications, for manipulation of microfilm sheets. The transducer 38 is then replaced with an optical magnifying system, and the carriage 6 and/or 11 is then preferably moved stepwise rather than continuously.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for optically scanning flexible sheet-like light-transmitting carriers of information, particularly microfilms or test films, comprising a support having a substantially horizontal upper side; first elongated quide means provided on said support; a first carriage movable along said guide means; second elongated quide means provided on said first carriage; a second carriage movable along said second guide means, said first and second guide means being at least substantially parallel to said upper side; coupling means provided on said second carriage and including a supporting surface for a portion only of the margin of a carrier of information and means for separably retaining such portion of the margin in contact with said surface, said surface being parallel with and closely adjacent to said upper side; means for moving said carriage along the respective guide means through distances sufficient to place any portion of information on a carrier which is coupled to said second carriage in register with a predetermined portion of said upper side; and optical scanning means including means for illuminating that portion of information on a carrier which register with said predetermined portion of said upper side, and an annular member in said support in register with said illuminating means, said annular member having a portion extending above said upper side to the general level of said supporting surface to provide a rest for a carrier which is coupled to said second carriage.

2. Apparatus as defined in claim 1 for optically scanning polygonal carriers of information, wherein said portion of the margin of a carrier which is coupled to said second carriage extends between two neighboring corners of the respective carrier, said coupling means further comprising magnet means for attracting said retaining means to said surface so that a portion of the margin which is located between said surface and said retaining means is held against shifting relative to said second carriage.

3. Apparatus as defined in claim 1, wherein said illuminating means comprises at least one light source at one side of the plane of a carrier which is coupled to said second carriage and said scanning means further comprises receiver means disposed at the other side of such carrier in the path of light issuing from said source and passing through the carrier.

4. Apparatus as defined in claim 1 for optically scanning carriers of the type having a plurality of openings provided in said portion of the margin thereof, wherein said coupling means further comprises a platform secured to said second carriage, said supporting surface being provided on said platform and said platform further having a plurality of projections extending through the openings of said portion of the margin of a carrier which is coupled to said second carriage.

5. Apparatus as defined in claim 4, wherein said platform extends in parallelism with the directon of movement of said second carriage along said second guide means and comprises a flat ledge having an upper side which constitutes said supporting surface, said retaining means comprising a member which overlies said surface and has openings for said projections.

6. Apparatus as defined in claim 5, wherein said platform has two projections and said member of said retaining means has a handle.

7. Apparatus as defined in claim 5, wherein said ledge consists of ferromagnetic material and said member of said retaining means includes a magnet which attracts said member to said ledge so that a portion of the margin of a carrier between said supporting surface and said member is held against shifting relative to said second carriage as a result of magnetic attraction of said member to said ledge as well as because said projections extend through the openings of such carrier.

8. Apparatus as defined in claim 1 for optically scanning sheet-like carriers having a predetermined thickness, wherein the distance between said supporting surface and said upper side is between two and four times said thickness.

9. Apparatus as defined in claim 1, wherein said annular member has a passage for light issuing from said illuminating means and said portion of said annular member is a portion of a hollow sphere.

10. Apparatus as defined in claim 1, further comprising means for directing a stream of gaseous fluid through said annular member and against the underside of a carrier which is coupled to said second carriage.

11. Apparatus as defined in claim 1, wherein said support includes a base plate and said upper side is provided on said base plate, said base plate having an opening for said annular member and said scanning means further comprising a tube disposed below said base plate and having an end portion in register with said annular member, said illuminating means being mounted in said tube and said scanning means further comprising lens means mounted in said tube between said illuminating means and said annular member and receiver means disposed above said upper side and located in the path of light issuing from said illuminating means and passing through said lens means, through said annular member and through a carrier which is coupled to said second carriage.

12. Apparatus as defined in claim 11, wherein said tube is straight and the optical axis of said lens means coincides with the path of light from said illuminating means to said receiver means.

13. Apparatus as defined in claim 11, wherein said annular member has a passage for light and said receiver means comprises a housing having a light-admitting opening in register with said passage.

14. Apparatus as defined in claim 11, wherein said receiver means comprises a photoelectric cell.

15. Apparatus as defined in claim 11, wherein said receiver means includes means for enlarging portions of images on microfilms.

16. Apparatus as defined in claim 1, wherein said portion of said annular member constitutes a portion of a hollow sphere having a flat located in the plane of said surface.

17. Apparatus as defined in claim 1, further comprising means for directing a stream of air through said annular member and against the underside of a carrier which is coupled to said second carriage.

18. Apparatus as defined in claim 17, wherein said scanning means further comprises a tube having an end portion in register with said annular member, said illuminating means and said stream directing means being mounted in said tube and said illuminating means being disposed intermediate said annular member and said stream directing means.

19. Apparatus as defined in claim 1, further comprising a light-transmitting cover overlying the carrier which is coupled to said second carriage and means for directing a stream of air upwardly through said annular member so that the stream urges the carrier against said cover.

* * * * *